(12) United States Patent
Mennucci et al.

(10) Patent No.: US 10,654,124 B2
(45) Date of Patent: May 19, 2020

(54) METHOD OF MAKING AN EDGE-TO-EDGE METAL COMPOSITE

(71) Applicants: Joseph P. Mennucci, Manville, RI (US); Michael D. Hardy, Cumberland, RI (US); Ronald R. Dos Santos, Hope Valley, RI (US); Donald G. McDonnell, Attleboro, MA (US); EMS ENGINEERED MATERIALS SOLUTIONS, LLC, Attleboro, MA (US)

(72) Inventors: Joseph P. Mennucci, Manville, RI (US); Michael D. Hardy, Cumberland, RI (US); Ronald R. Dos Santos, Hope Valley, RI (US); Donald G. McDonnell, Attleboro, MA (US); Michael Balkenhol, Werl (DE)

(73) Assignees: EMS Engineered Materials Solutions, LLC, Attleboro, MA (US); Wickeder Westfalenstahl GmbH, Wickede (Ruhr) (DE)

( * ) Notice: Subject to any disclaimer, the term of this patent is extended or adjusted under 35 U.S.C. 154(b) by 97 days.

(21) Appl. No.: 15/563,778

(22) PCT Filed: Jul. 23, 2015

(86) PCT No.: PCT/US2015/041857
§ 371 (c)(1),
(2) Date: Oct. 2, 2017

(87) PCT Pub. No.: WO2016/160049
PCT Pub. Date: Oct. 6, 2016

(65) Prior Publication Data
US 2018/0065206 A1    Mar. 8, 2018

Related U.S. Application Data

(60) Provisional application No. 62/142,753, filed on Apr. 3, 2015.

(51) Int. Cl.
*B23K 20/02* (2006.01)
*B23K 20/233* (2006.01)
(Continued)

(52) U.S. Cl.
CPC ............ *B23K 20/023* (2013.01); *B23K 20/00* (2013.01); *B23K 20/02* (2013.01);
(Continued)

(58) Field of Classification Search
CPC .. B23K 20/023; B23K 20/2333; B23K 20/02; B23K 20/00; B23K 2103/166;
(Continued)

(56) References Cited

U.S. PATENT DOCUMENTS 3,682,606 A    8/1972   Anderson et al.
3,938,723 A    2/1976   Slaughter
(Continued)

OTHER PUBLICATIONS

The International Search Report/Written Opinion issued in the parent PCT application, PCT/US2015/041857, dated Oct. 19, 2015; 8 pages.
(Continued)

*Primary Examiner* — John C Hong
(74) *Attorney, Agent, or Firm* — Smith Gambrell & Russell LLP

(57) ABSTRACT

A clad metal composite produced according to a method for edge-to-edge cladding of two or more different metals (such as aluminum and copper). The metals are joined next to each other to form an edge-to-edge or side-by-side clad bimetal. In one embodiment, nine metal strips are used to create the desired clad metal composite. The design includes strips of metal that have industry standard cut edges (such as, slit-cut edges). In one embodiment, the clad metal composite includes multiple layers of metals positioned edge-to-edge. In one embodiment, the method of making an edge-to-edge
(Continued)

composite includes providing multiple layers of metal made of separate strips, aligning the strips in the multiple layers with one another so that edges of the strips of the multiple layers do not align with one another, and then bonding the layers and strips to one another.

25 Claims, 14 Drawing Sheets

(51) Int. Cl.
| | |
|---|---|
| B32B 15/01 | (2006.01) |
| B23K 20/00 | (2006.01) |
| C22C 21/00 | (2006.01) |
| C22C 38/00 | (2006.01) |
| C22C 9/00 | (2006.01) |
| C22C 19/03 | (2006.01) |
| C22C 38/18 | (2006.01) |
| B23K 103/10 | (2006.01) |
| B23K 103/12 | (2006.01) |
| B23K 103/18 | (2006.01) |
| B23K 103/16 | (2006.01) |

(52) U.S. Cl.
CPC .......... *B23K 20/2333* (2013.01); *B32B 15/01* (2013.01); *B32B 15/012* (2013.01); *B32B 15/015* (2013.01); *B32B 15/017* (2013.01); *C22C 9/00* (2013.01); *C22C 19/03* (2013.01); *C22C 21/00* (2013.01); *C22C 38/00* (2013.01); *C22C 38/18* (2013.01); *B23K 2103/10* (2018.08); *B23K 2103/12* (2018.08); *B23K 2103/166* (2018.08); *B23K 2103/18* (2018.08)

(58) Field of Classification Search
CPC ............ B23K 2103/12; B23K 2103/10; B23K 2103/18; B32B 15/015; B32B 15/012; B32B 15/017; B32B 15/01; C22C 38/18; C22C 38/00; C22C 21/00; C22C 19/03; C22C 9/00
See application file for complete search history.

(56) References Cited

U.S. PATENT DOCUMENTS

| | | | |
|---|---|---|---|
| 4,333,216 | A | 6/1982 | Slaughter |
| 4,798,932 | A | 1/1989 | Dion |
| 5,306,571 | A | 4/1994 | Dolowy et al. |
| 5,429,879 | A | 7/1995 | Syn et al. |
| 2006/0186178 | A1* | 8/2006 | Bauder ............... B21B 1/38 228/117 |
| 2011/0206943 | A1 | 8/2011 | Willis |

OTHER PUBLICATIONS

The European Search Report pursuant to Rule 62 EPC dated Aug. 18, 2013, in the corresponding European patent application, European Patent Application No. 15888049.2; 8 pages.

The Japanese Office Action dated Mar. 19, 2019 in the corresponding Japanese patent application, Japanese Patent Application No. 2018-503458; 10 pages.

* cited by examiner

US 10,654,124 B2

METHOD OF MAKING AN EDGE-TO-EDGE METAL COMPOSITE

CROSS-REFERENCE TO RELATED APPLICATIONS

The present application claims priority from Provisional Patent Application No. 62/142,753, filed on Apr. 3, 2015, the disclosure of which is relied upon and incorporated herein by reference.

FIELD OF THE INVENTION

This invention relates to a metallic laminate composite having multiple layers clad in an edge-to-edge arrangement.

BACKGROUND OF THE INVENTION

Single metal products rarely exhibit all of the properties that are desired. As a result, it is often necessary to combine or clad metals together to achieve a product having the desired properties. Through the roll cladding of metals, it is possible to put disparate metals together in a process that opens the door for design of exciting new products. Cladding is generally provided by compressing metal strips together with heat and/or pressure, through the use of a roll cladding mill or a press. However, conventional cladding has limitations with respect to edge-to-edge cladding. These limitations are addressed in the process described herein.

SUMMARY OF THE INVENTION

A process for edge-to-edge cladding of two or more strips of different metals (such as aluminum and copper) is described herein. The metal strips are joined next to each other to form an edge-to-edge or side-by-side clad bimetal. In one embodiment, nine metals strips are used to create the desired clad metal composite. The design includes strips of metal that have industry standard cut edges. The clad metal composite may include multiple layers of metals positioned edge-to-edge for cladding.

DETAILED DESCRIPTION OF THE INVENTION

A new process for edge-to-edge cladding of metals is described herein. Essentially, two or more different metals (such as aluminum and copper, although other combinations may be used) are joined next to each other to form an edge-to-edge or side-by-side clad bimetal 10 (see FIGS. 1-3).

Figure 2:
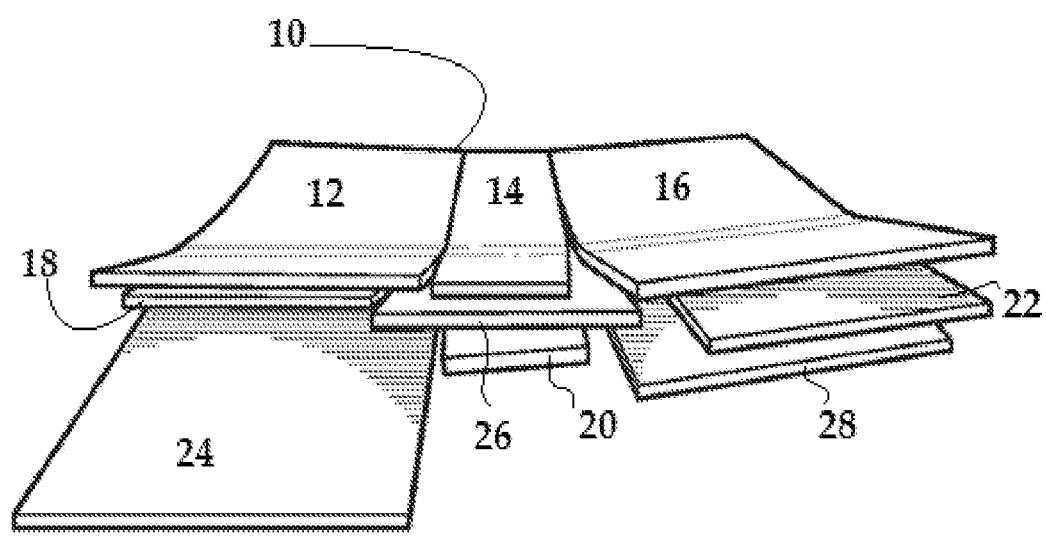
FIG. 2 is a perspective view of individual strips of metal to form a clad metal composite using the edge-to-edge bimetal cladding process.
Figure 3:
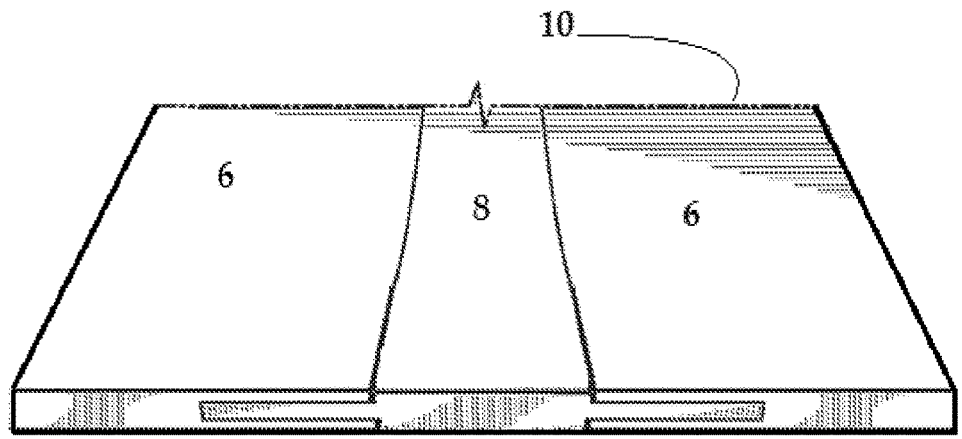
FIG. 3 is an end view of the clad metal composite.
Figure 5A:
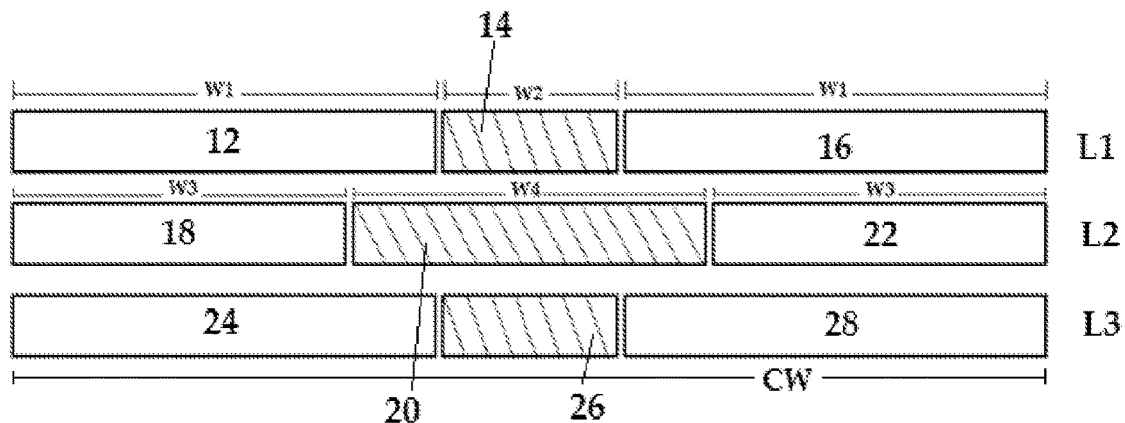
FIG. 5A is an end view of a basic bond configuration of nine layers of metals to be clad using the edge-to-edge bimetal cladding process.
Figure 5B:
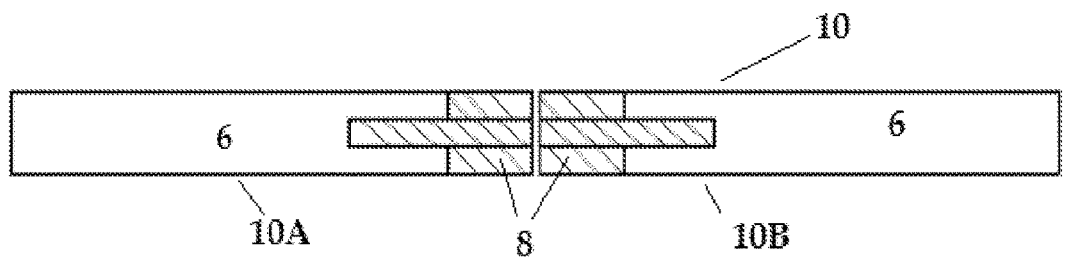
FIG. 5B is an end view of the combined layers of the bonded clad metal composite illustrated in FIG. 5A, the combined layers being split into left and right slit-cuts.

Looking at FIGS. 2, 5A, and 5B, nine strips of metals are used to create the desired clad metal composite 10. The strips of metal have non-profiled, substantially straight strip edges, such as industry standard slit edges. In the embodiment described herein, the strips of metal are made of copper and aluminum; however, a variety of metal combinations may be implemented to provide the clad metal composite 10. For example, the combination could include a first metal of the following metals including, but not limited to, aluminum, nickel, steel and/or stainless steel joined with copper, steel and/or stainless steel joined with aluminum, or other multiple metal combinations.

Referring to FIGS. 5A and 5B, the clad metal composite 10 of a first embodiment includes three layers L1, L2, L3, with each layer L1, L2, L3 having three strips of metal. That is, the first layer L1 includes first and second side strips 12, 16 positioned on opposite sides of first center strip 14, the second layer L2 includes third and fourth side strips 18, 22 positioned on opposite sides of second center strip 20, and the third layer L3 includes fifth and sixth side strips 24, 28 positioned on opposite sides of third center strip 26. In the illustrated embodiment, each layer L1, L2, L3 has two side strips of a first metal (such as solid aluminum) and one strip of a second metal (such as copper). The side strips of the first metal are labeled 12, 16, 18, 22, 24 and 28, and the center strips of the second metal are labeled 14, 20, 26. In this embodiment, each individual strip of the second metal (e.g., copper) is centrally positioned between two strips of the first metal (e.g., aluminum), with the side strips abutting the center strip. The side strips of the first metal are clad or bonded alongside the center strips of the second metal. However, it is foreseen that the composition of the metal strips could be reversed. That is, each layer could include two strips of copper on two sides of a strip of aluminum.

Continuing to view FIG. 5A, each layer L1, L2, L3 substantially has a composite width CW. Referring to the first layer L1, the width W2 of the center strip 14 is substantially the same as the width of the center strip 26 in the third layer L3. In comparison, the width W4 of the center interlayer strip 20 in the second or middle layer L2 is substantially greater than the width W2 of the center strips 14, 26 in the first and third layers L1, L3. Likewise, the width W1 of the first and second side strips 12, 16 is substantially commensurate with the width of the fifth and sixth side strips 24, 28, while the width W3 of the third and fourth side strips 18, 22 in the second layer L2 is less than the width W1 of the side strips 12, 16, 24, 28 in the first and third layers L1, L3. The differences in the width W4 of the center interlayer strip 20 and the width W2 of the upper and lower center strips 14 and 26 will result in an "overlapping" stepped clad bond zone in the central region of the clad metal composite 10. This metal strip width overlap can be controlled to vary bond zone region as may be required for custom applications. FIGS. 5A and 5B show the center interlayer strip 20 touching each of the eight other strips 12, 14, 16, 18, 22, 24, 26, 28, with the aluminum surrounding sides of the center interlayer strip 20 and copper strips 14 and 26 adjacent the top and bottom of the center interlayer strip 20 as the metals to be clad enter the bonding mill 299. The present clad metal composite utilizes a "stepped" or staggered inner layer(s) to provide the basis of the bonded joint configuration of the clad metal composite 10.

The metal strips 12-28 can be bonded utilizing heated or non-heated bonding mill rolls 300, 302, 304, 306 in a bonding mill 299. Multiple core layer configurations can be produced with or without intermediate heat treatment. Avoiding intermediate heat treatments can be beneficial by minimizing the formation of possibly harmful copper-aluminum intermetallics as described herein. Clad metal composite properties of the bonded composite 10 can be optimized during the heat treatment cycle. Heat treatment cycle can be achieved by batch or continuous heat treatment.

Figure 4:
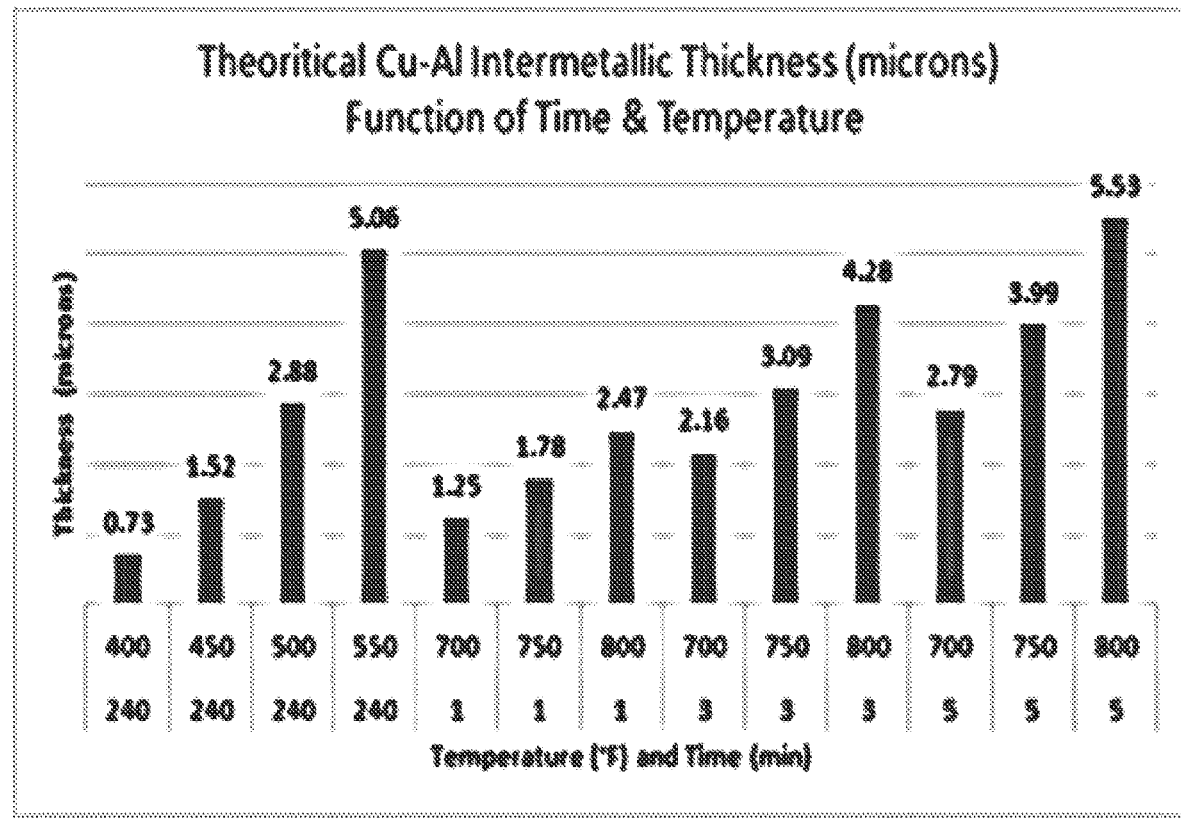
FIG. 4 is a chart providing a summary of the theoretical copper-aluminum intermetallic compound thickness as a function of time and temperature.

FIG. 4 is a chart that provides a summary of the theoretical copper-aluminum intermetallic compound (IMC) thickness comparison between the expected temperature and time cycles for both a Batch Sinter Heat Treatment and a Strand Sinter Heat Treatment. The expected IMC growth for the 450° F./4 Hr Batch Sinter is ~1.52 microns. The expected IMC Growth for the 750° F./3 Min Strand Sinter is ~3.09 microns. Therefore, the batch sinter process is preferred in the present design, and is expected to result in essentially half the IMC thickness of the Strand Sinter process. The importance of this IMC Growth is the negative effect it has on bond strength, formability, thermal and electrical conductivity. Increased IMC thickness reduces bond strength, formability, thermal and electrical conductivity.

FIGS. 5A and 5B illustrate one exemplary embodiment of the clad metal composite 10. While not limited to the illustrated configuration, this embodiment shows nine independent copper and aluminum strips bonded as one single clad metal composite 10. That is, the single clad assembly 10 includes three top strips, three middle strips, and three bottom strips. Other embodiments are described herein.

Figure 1:
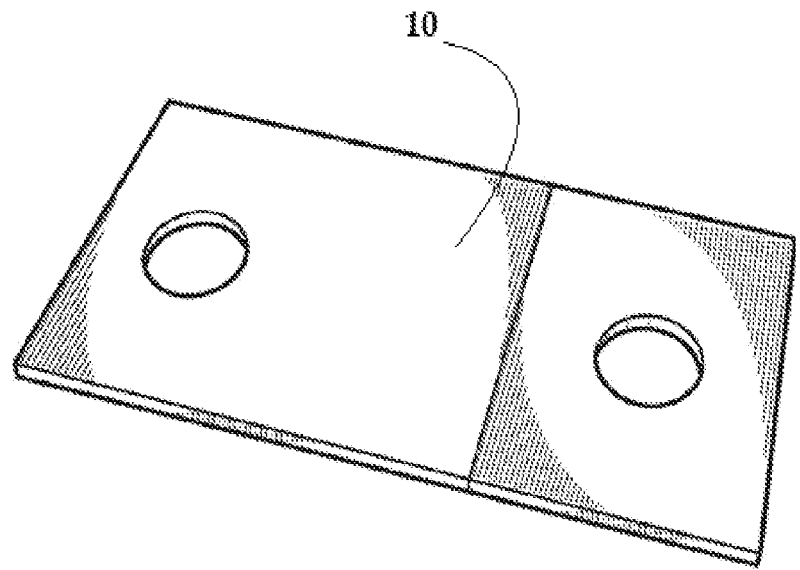
FIG. 1 is a perspective view of a clad metal composite formed according to the edge-to-edge bimetal cladding process.

Looking to FIGS. 5B, 6B, 7B, 9B, 10B, 13C, 14D, 15D, and 16D, the bonded clad metal composite 10 can be slit to produce a left and right strip profiles that could then be stamped into the formed stamp parts, as depicted in FIG. 1.

Figure 15:
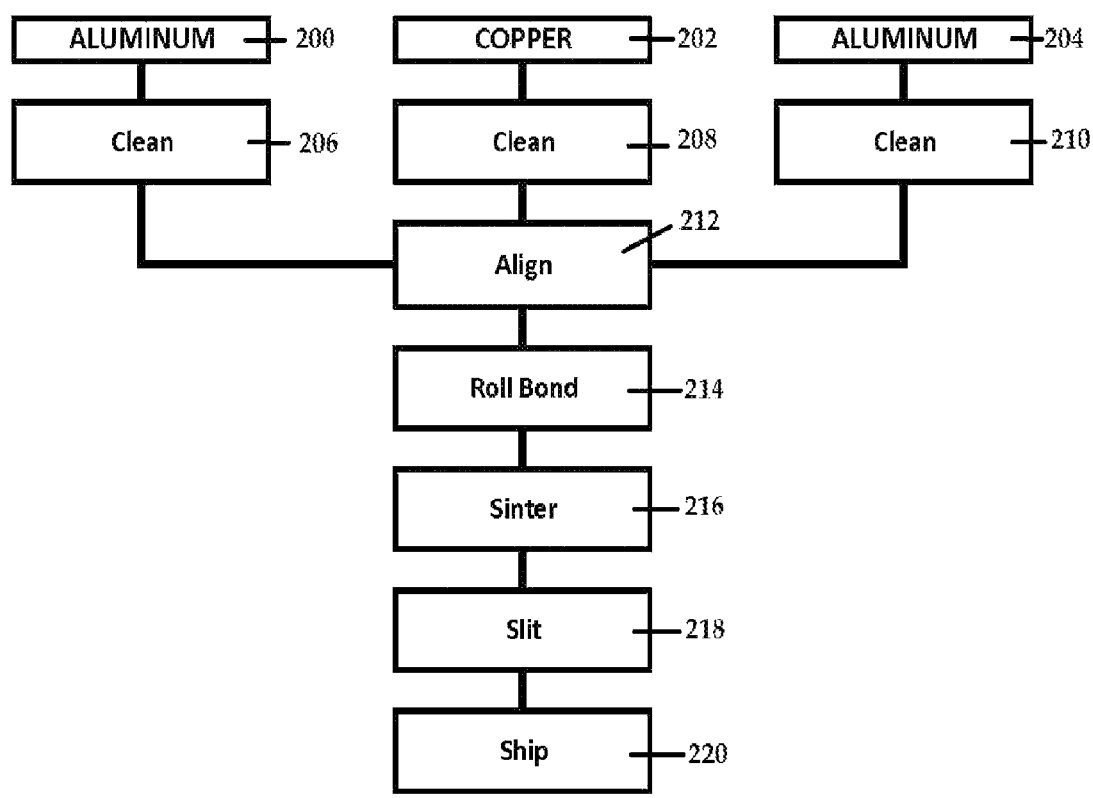
FIG. 15 is a process flow chart illustrating the process steps for bonding the metal strips made from a first metal and a second metal.

The process for bonding the various strips into a clad metal composite 10 is illustrated in FIG. 15. Initially, the metals to be used in the clad metal composite 10 are selected in steps 200, 202, 204. In the illustrated embodiment, there are metal strips in each layer that are comprise aluminum and copper (as well as other potential embodiments). The design includes strips of metal that have industry standard cut edges. The various metal strips are prepared for bonding via cleaning in steps 206, 208, 210. Cleaning dirt and oils from the strip surface is necessary to ensure clad bond integrity. In the present embodiment, cleaning is performed to ensure the surface of each strip is properly prepared for clad bonding.

Once the metals are prepared, the multiple metal strips are aligned (step 212) so that the industry standard cut edges in each layer L1, L2, L3 are positioned as desired. In the nine-strip embodiment shown in FIGS. 5A and 5B, each of the respective three layers L1, L2, L3 are aligned according to the desired embodiment and application. Referring to FIG. 5A, metal strips 12, 14, 16 in the top layer L1 are aligned so that the central metal strip 14 abuts strips 12, 16; metal strips 18, 20, 22 in the middle layer L2 are aligned so that the central metal strip 20 abuts strips 18, 22, and metal strips 24, 26, 28 in the bottom layer L3 are aligned so that the central metal strip 26 abuts strips 24, 28. The metal strips are aligned in each layer L1, L2, L3, and each layer L1, L2, L3 is aligned with respect to the other layers L1, L2, L3 to achieve the desired overlapping step clad metal composite.

Figure 16:
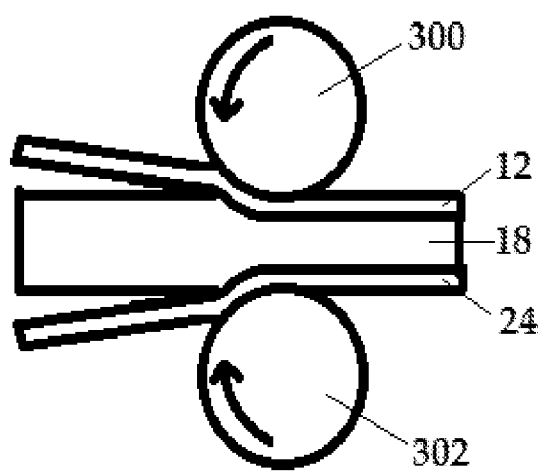
FIG. 16 is an illustration of the layers of metals being clad using two rollers.

The alignment of the metal strips may be performed using custom guides that are known in the art and not specifically illustrated in the attached figures. These guides align the various individual metal strip widths simultaneously as they are drawn into the bonding mill rolls 300, 302, 304, 306. For example, FIG. 16 provides a schematic illustrating nine various individual metal strip widths 12-28 simultaneously being drawn into the rolls 300, 302, 304, 306 of the bonding mill 299. However, the number of layers and strips may be varied according to the desired use by the producer.

Figure 17:
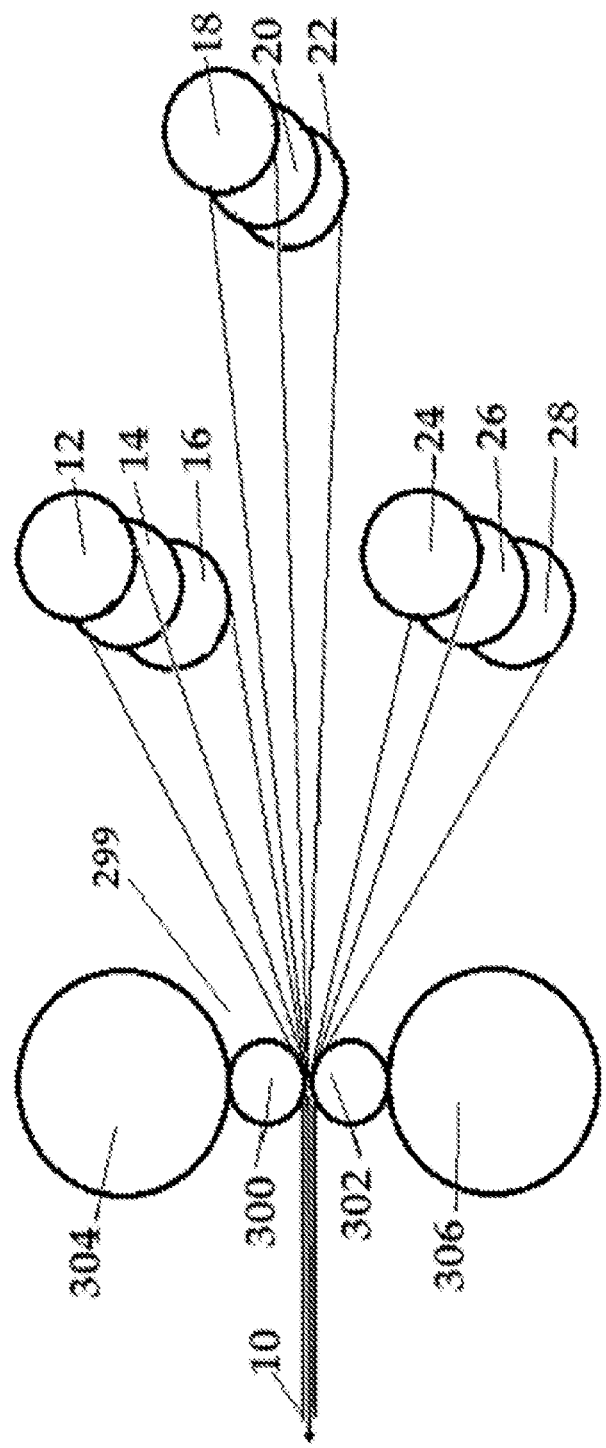
FIG. 17 is a diagram of a bonding mill assembly used to clad nine layers of a metal into a single clad metal composite.

The next step is the roll bond (step 214). This is the process step where the individual metal strips are "clad" into one piece comprising a portion made of the first metal 6 and a portion made of the second metal 8. Looking to FIG. 17, this step is performed on a roll cladding mill 299 specifically design and built to withstand the separating force and heat generated during the heavy metal thickness reduction.

The bonded layers L1, L2, L3 may then treated through sintering (step 216). Sintering is a heat treatment step which promotes the metallurgical bond between the clad layers. This heating process can be done using a continuous strand annealing furnace or a batch annealing furnace. The bonded layers may be processed using either option, and the processing option is selected according to the best method known in the art based on the metal requirements and final mechanical properties as specified by the end user.

For the copper-aluminum metal system the formation of "intermetallic" compounds can be detrimental to the bond integrity (bond strength), formability, thermal and electrical conductivity. FIG. 4 includes a graph that provides a theoretical comparison of the calculated copper-aluminum intermetallic (IMC) thickness values as a function of time and temperature.

The producer will determine best manufacturing practices to meet final customer specifications. The clad metal composite 10 is then slit (step 218) and readied for inspection and shipment (step 220).

Figure 6A:
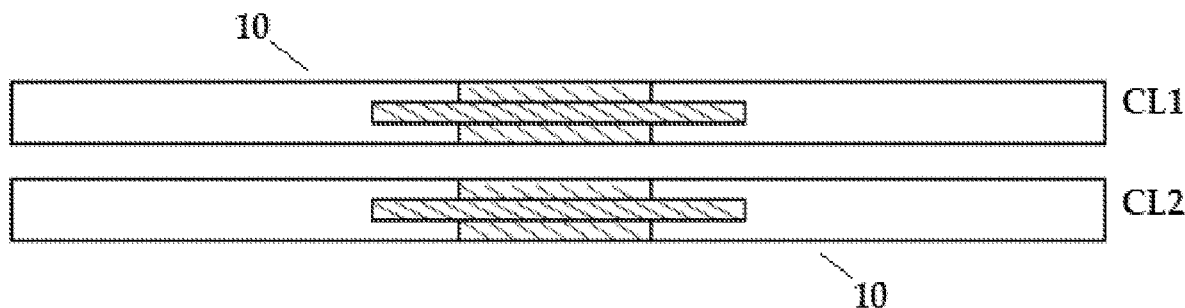
FIG. 6A is an end view of two single core layer clad metal composites, a top layer and a bottom layer as prepared to produce a dual-core bonded configuration.
Figure 6B:
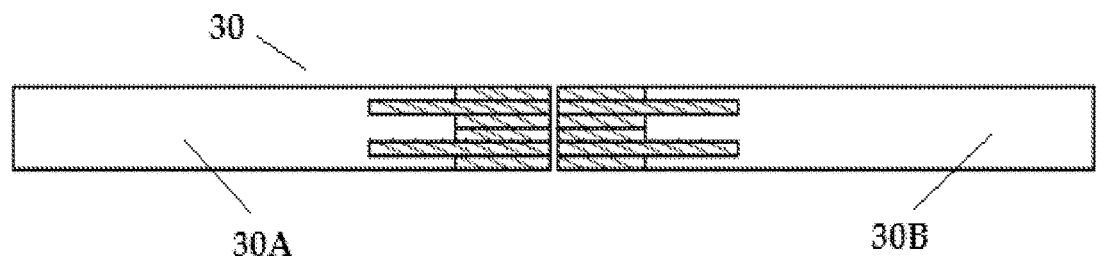
FIG. 6B is an end view of the clad metal composite having a double layer clad metal composite as shown in FIG. 6A, being split into left and right slit-cuts.
Figure 18:
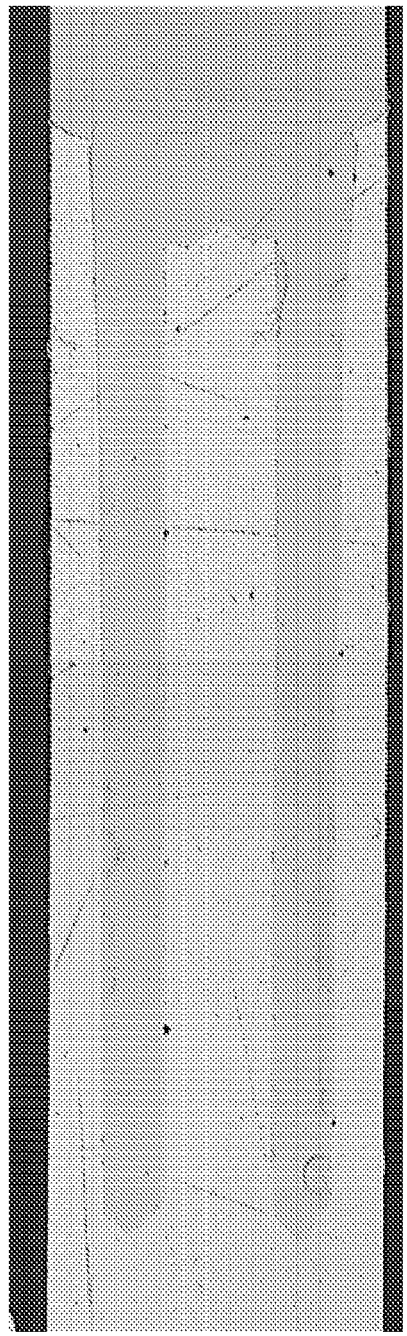
FIG. 18 is a photomicrograph of the double core copper-aluminum at the transition from copper to aluminum.

Furthermore, one set of bonded metal strips of the clad metal composite 10 may be combined with a separate clad metal composite 10, with the resulting clad metal composite 30 having additional clad composite layers CL1, CL2. Such an embodiment is illustrated in FIGS. 6B and 7B. In FIGS. 6A and 6B, a clad metal composite 30 having a double core layer bond configuration is shown. In this embodiment, two independent sets or composite layers CL1, CL2 of bonded strips 10 are combined to achieve a clad metal composite 30 having a desired thickness with two copper core extensions. That is, once each set of clad metal composite 10 has been bonded as described above, the two sets will then be aligned and roll cladded together to produce the clad metal composite 30. A photomicrograph of the double core copper-aluminum at the transition from copper to aluminum is provided in FIG. 18, and this photograph illustrates the stair step configuration. Referring to FIG. 6B, the clad metal composite 30 may then be slit into two clad halves 30A and 30B.

Figure 7A:
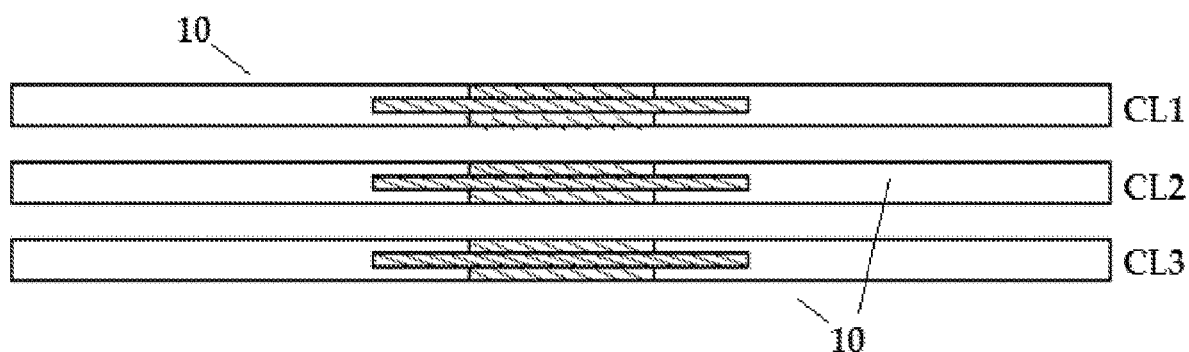
FIG. 7A is an end view of three single core layer clad metal composites, a top layer, a middle layer, and a bottom layer as prepared to produce a triple-core bonded configuration.
Figure 7B:
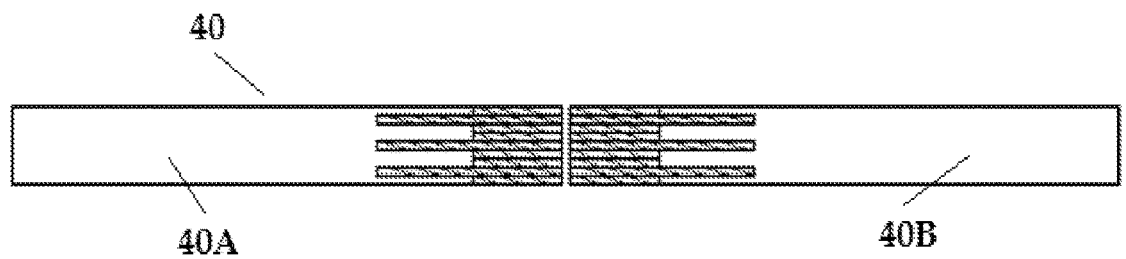
FIG. 7B is an end view of the bonded clad metal composite having a triple layer clad metal composite as showing in FIG. 7A, being split into left and right slit-cuts.

FIGS. 7A and 7B illustrate a triple layer bond configuration, with three layers CL1, CL2, CL3 of multilayer bonded strips 10. The process to prepare a triple layer bond is to first form three independent sets of multilayer bonded strips 10, align each of the sets with each other, and then roll clad the three sets of bonded strips 10 to achieve the desired triple core layer clad material 40. The clad material 40 may then be slit into two clad material halves 40A and 40B.

Figure 8A:
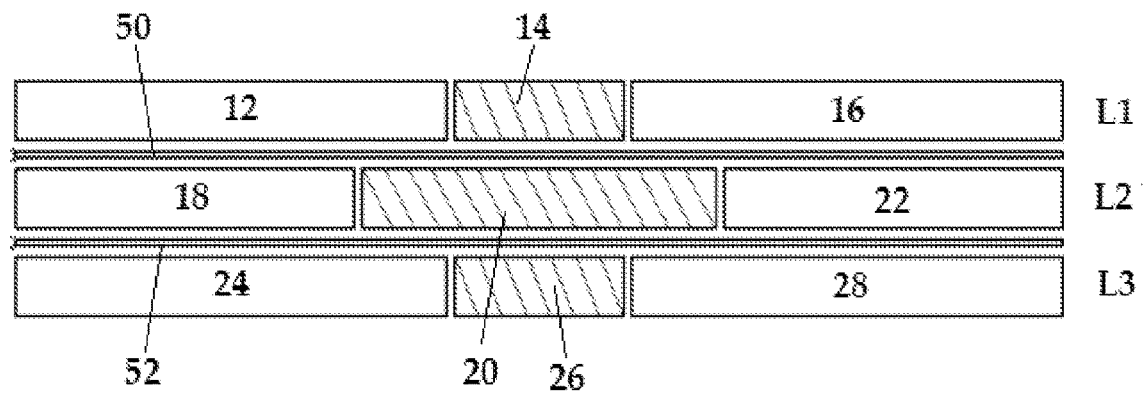
FIG. 8A is an end view of a basic bond configuration of nine layers of metals to be clad using the edge-to-edge bimetal cladding process as shown in FIG. 5A, with two additional metal strengtheners added as additional layers.
Figure 8B:
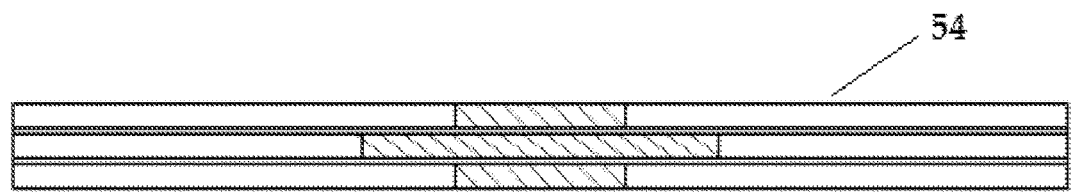
FIG. 8B is an end view of the combined layers of the bonded clad metal composite illustrated in FIG. 8A.

Looking to FIGS. 8A and 8B, an additional embodiment is illustrated. In this embodiment, the set of bonded layers L1, L2, L3 illustrated in FIG. 5A additionally includes one or more supplemental metal strengthener layers 50, 52 positioned between the multi-metal strip layer L1, L2, L3 and bonded to for the clad metal composite 54. The sets of bonded metal strips are prepared as described above, simply with the additional supplemental metal strengthener layers 50, 52 positioned in between the layers L1, L2, L3. That is, one strengthener layer 50 may be positioned between the first layer L1 and the second layer L2, and a second strengthener layer 52 may be positioned between the second layer L2 and the third layer L3. As an example, the additional metal strengthener layer 50, 52 can be from the group of nickel, aluminum, copper, steel, stainless steel or other similar material in the copper-aluminum configuration. The metal strengthener layer 50, 52 will increase the bulk metal strength and alter the thermal and electrical resistivity of the cladded metals 54.

Figure 9A:
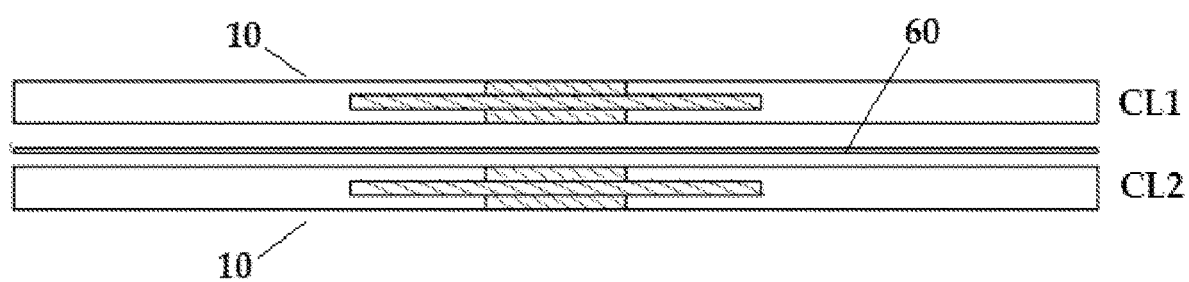
FIG. 9A is an end view of a double layer clad metal composite having a dual-core, with a top layer, a bottom layer, and a metal strengthener positioned between the top layer and bottom layer as prepared for bonding.
Figure 9B:
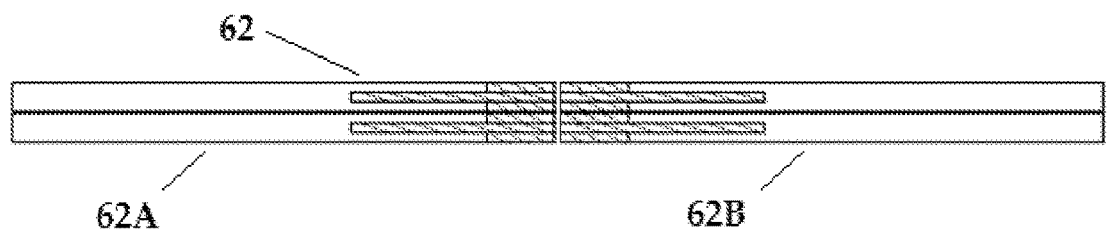
FIG. 9B is an end view of the bonded clad metal composite having a double layer clad metal composite with a metal strengthener as showing in FIG. 9A.

Looking to FIGS. 9A and 9B, an additional embodiment of the invention is illustrated in which a supplemental strengthener layer 60 of an additional metal is positioned between two clad metal composites 10 having composite layers CL1, CL2. In this embodiment, each clad metal composite 10 is prepared as described above and are prepared to be bonded together to create a double core layer bond clad composite 30, but an additional metal strengthener layer 60 is positioned between the clad metal composites 10. The clad metal composites 10 and strengthener layer 60 are roll bonded to achieve a strengthened double core layer bond clad composite 62. The clad material 62 may then be slit into two clad metal composite halves 62A and 62B (see FIG. 9B).

Figure 10A:
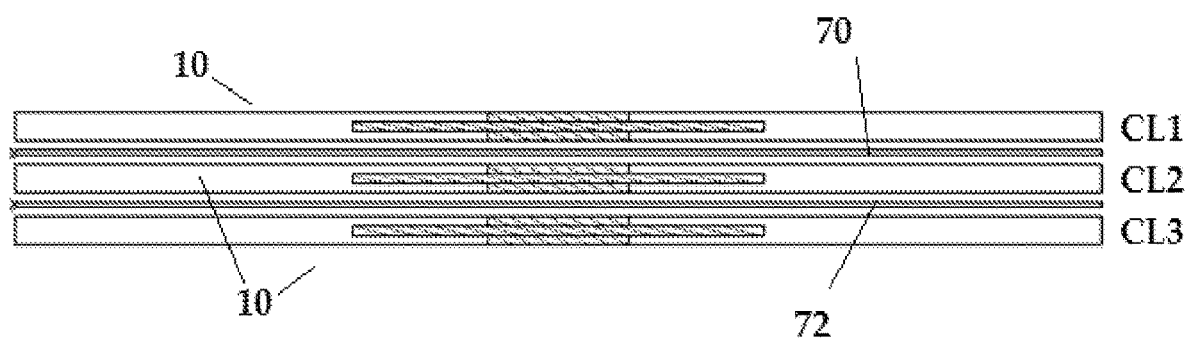
FIG. 10A is an end view of a triple layer clad metal composite having a triple-core, with a top layer, a middle layer, and a bottom layer, and a first metal strengthener between the top and middle layers and a second metal strengthener between the middle and bottom layers as prepared for bonding.
Figure 10B:
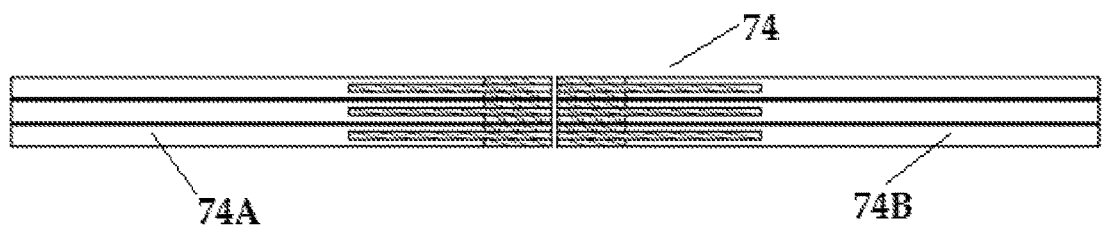
FIG. 10B is an end view of the bonded clad metal composite having a triple layer clad metal composite with metal strengthener layers as showing in FIG. 10A.

FIGS. 10A and 10B illustrate a similar embodiment to the one illustrated in FIGS. 9A and 9B, with this embodiment including three layers CL1, CL2, CL3 of bonded core layers 10 that are combined together with two additional metal layers 70, 72 positioned between each set of bonded metal strips 10. The sets 10 are bonded together to create a triple core layer bond clad metal composite 74, but the additional metal layer 72 is positioned between the sets that are roll bonded to achieve a desired result. The clad material 74 may then be slit into two clad metal composite halves 74A and 74B.

Finally, looking to FIGS. 12A-14D, additional embodiments of independent sets of bonded layers prepared according to the steps described above. These embodiments illustrate that other combinations of layer configurations may be prepared in addition to the three layers of three strips of metals as described above. The common element to each design is that there is a stair step arrangement of strips of differing metals that are positioned in an edge-to-edge arrangement.

Figure 11A:
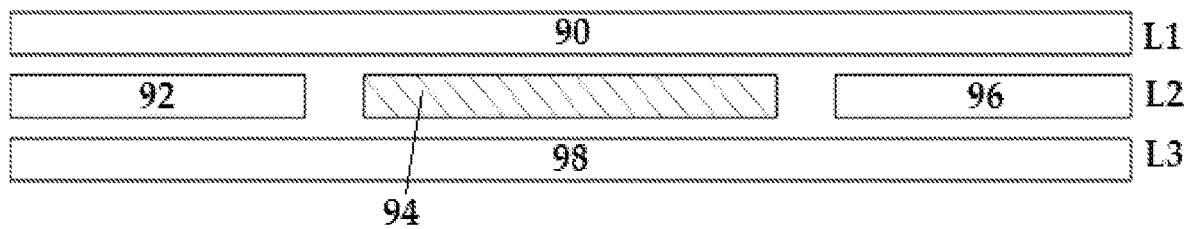
FIG. 11A is an end view of a clad metal composite of five layers of metals to be clad using the edge-to-edge bimetal cladding process.
Figure 11B:
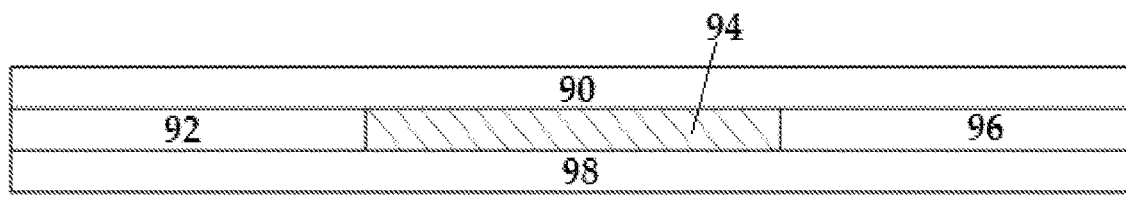
FIG. 11B is an end view of the combined layers of the clad metal composite illustrated in FIG. 11A.
Figure 11C:
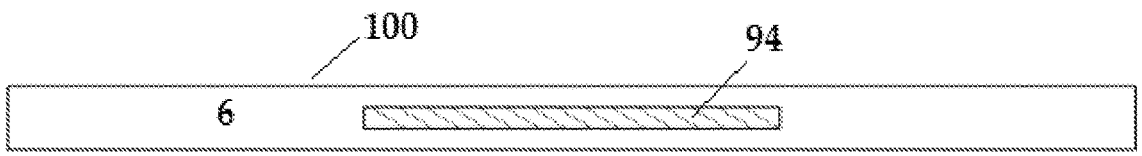
FIG. 11C is an end view of the bonded clad metal composite as illustrated in FIGS. 11A and 11B.

FIGS. 11A, 11B and 11C illustrate an embodiment that includes three metal layers: a base layer L3, a primary layer L2, and a top layer L1. However, in this embodiment, the top layer L1 and the base layer L3 have single metal strips 90, 94, respectively, of aluminum. The metal strips 92, 94, 96 in the middle metal layer include a single metal strip of copper 94 with metal strips 92, 96 of aluminum on both sides of the copper strip 94. As a result, there is a single layer 94 of copper in the center of the clad material 100, with the stair step configuration, as shown in FIG. 11C. When bonded, the aluminum layers combine into a single layer 6 with the independent copper layer 94 in a locked connection in the layer 6.

Figure 12A:
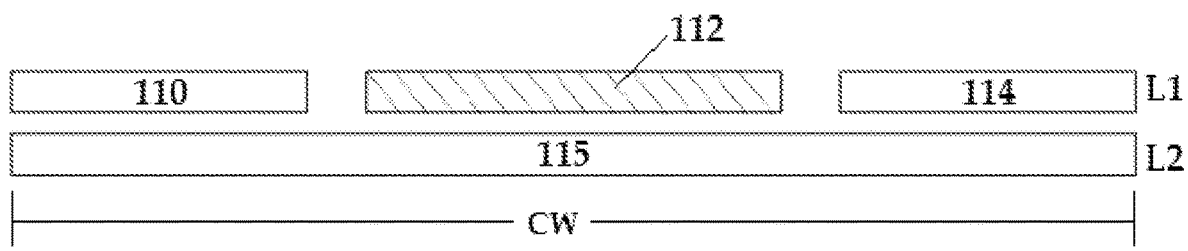
FIG. 12A is an end view of an inlay clad metal composite of four layers of metals to be clad using the edge-to-edge bimetal cladding process.
Figure 12B:
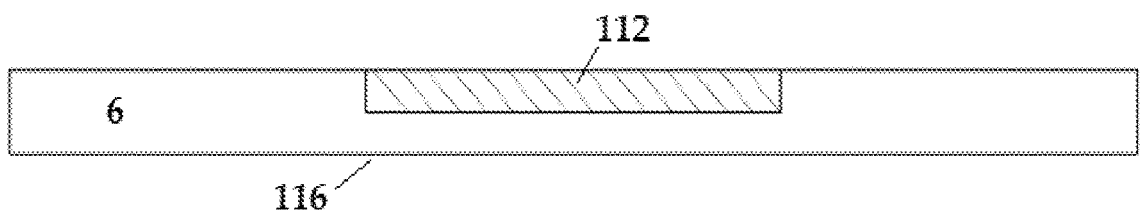
FIG. 12B is an end view of the combined layers of the bonded clad metal composite illustrated in FIG. 12A.

FIGS. 12A and 12B illustrate embodiments related to the one shown in FIGS. 11A, 11B, and 11C, with the top aluminum layer shown in FIGS. 11A, 11B, 11C removed from the bonded set of layers to achieve the clad metal composite 116. Therefore, there is a base layer 116 of aluminum with the top layer having three metal strips—a center strip 112 of copper positioned between two side strips 110, 114 of aluminum. This embodiment is further shown in FIG. 12C with a central cut to create two split strips of bonded metals 116.

Figure 12C:
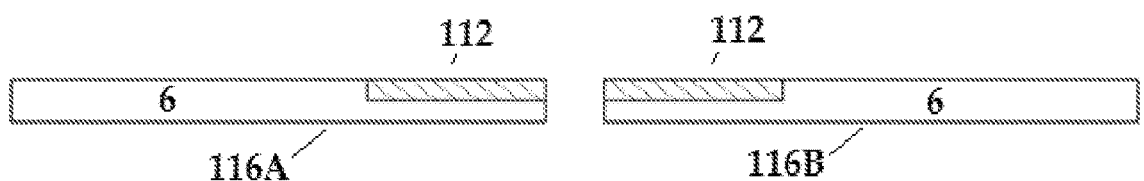
FIG. 12C is an end view of the combined layers of the bonded clad metal composite illustrated in FIG. 12A, the combined layers being split into left and right cuts.
Figure 13A:
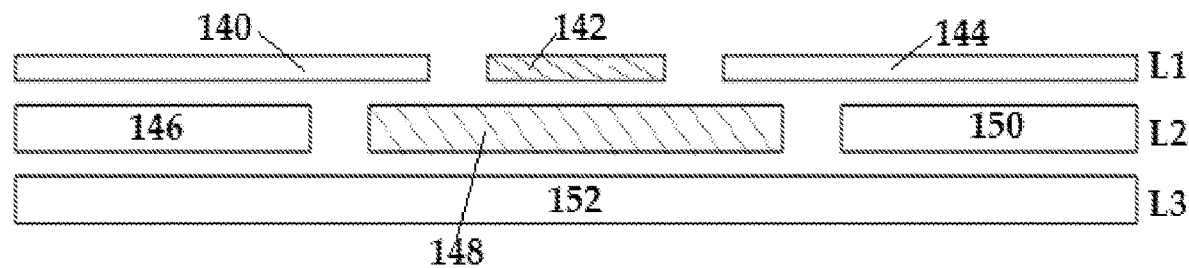
FIGS. 13A and 13B are end views of an inlay clad metal composite of seven layers of metals to be clad using the edge-to-edge bimetal cladding process.
Figure 13B:
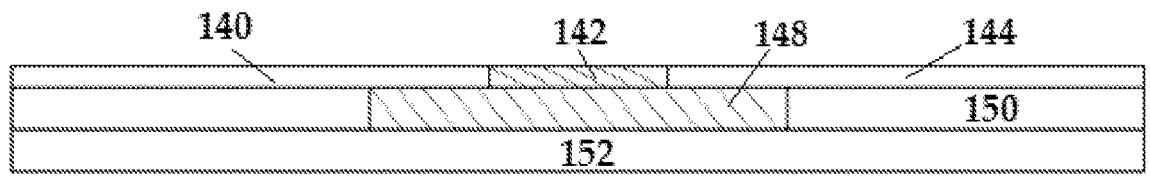
Figure 13C:
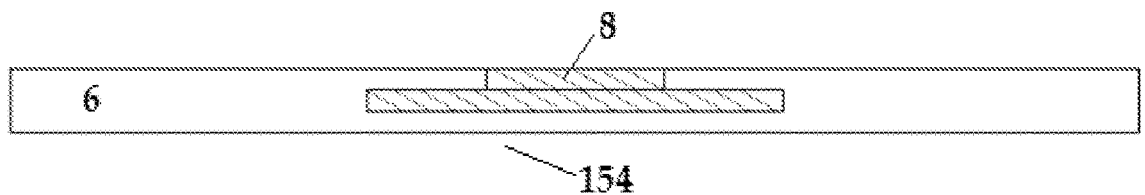
FIG. 13C is an end view of the combined layers of the bonded clad metal composite illustrated in FIG. 13A.
Figure 13D:
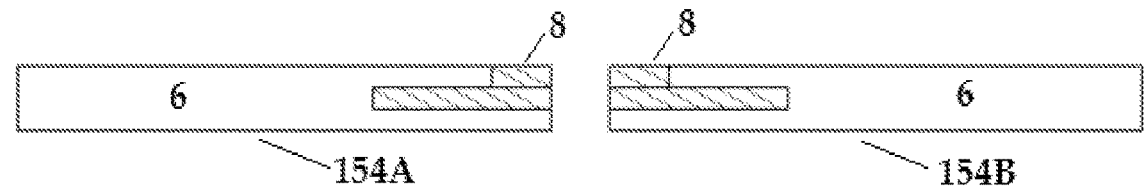
FIG. 13D is an end view of the combined layers of the clad metal composite illustrated in FIG. 13A, the combined layers being split into left and right slit-cuts.
Figure 14A:
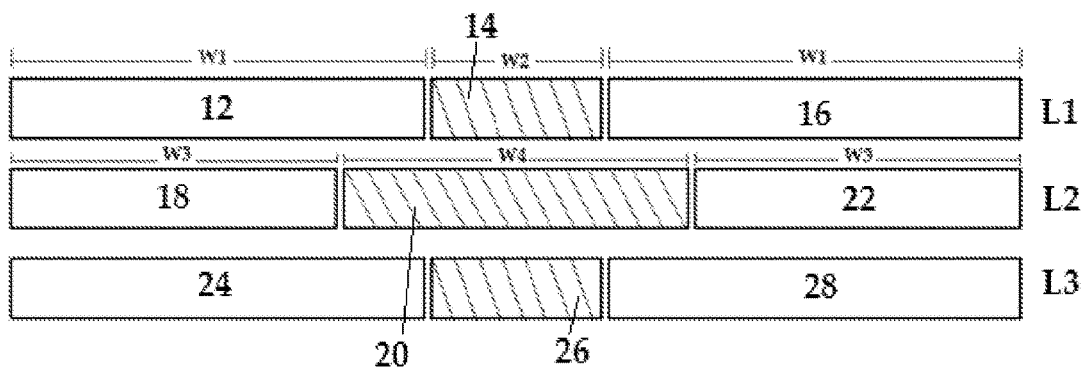
FIGS. 14A, 14B, 14C, 14D, and 14E illustrate an embodiment of the clad material that includes four metal layers.
Figure 14B:
Figure 14C:
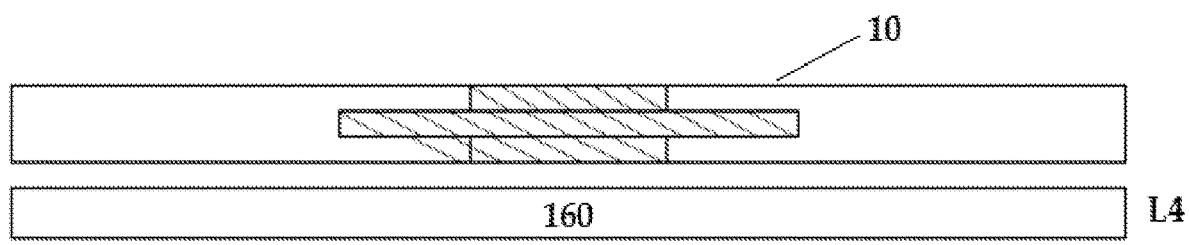
Figure 14D:
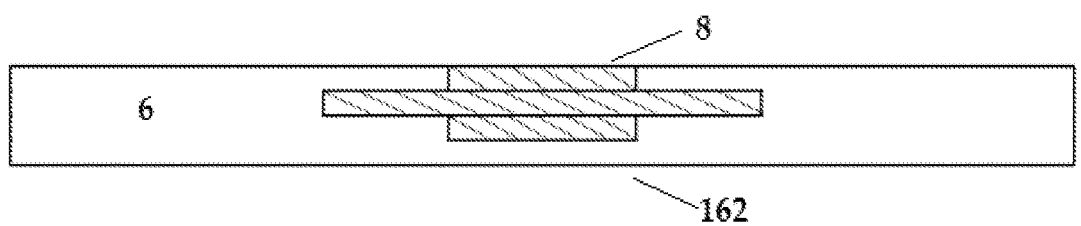
Figure 14E:
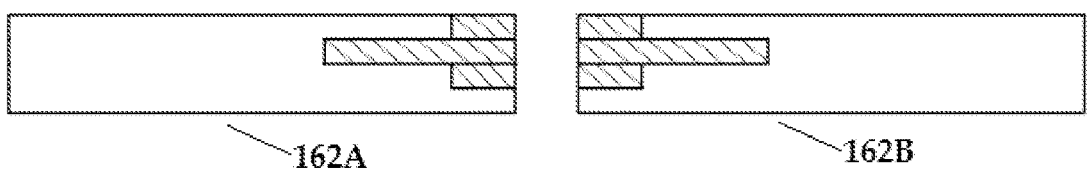

FIGS. 12A, 12B and 12C illustrate the two layer embodiment. The base layer L2 is a single metal strip 115 of aluminum. A primary or top layer L1 positioned on the base layer L2 includes a copper strip 112 with aluminum strips 110, 114 of aluminum edge to edge to both sides of the copper strip 112. The combined width of the three metal strips 110, 112, 114 in top layer L1 is substantially equivalent to the width of the base layer L2. The strips 110, 112, 114, 115 are bonded together to create the clad metal composite 116 comprising the first metal 6 cradling the second metal 112. The clad metal composite 116 may then be slit into two clad metal composite halves 116A and 116B.

FIGS. 13A, 13B, 13C and 13D illustrate an embodiment that includes three metal layers L1, L2, L3. However, in this embodiment, the top layer L1 has two metal strips 140, 144 of a first metal (e.g., aluminum) and a central metal strip 142 of a second metal (e.g., copper) and the base layer L3 has a single metal strip 152 of the first metal. The metal strips 146, 148, 150 in the center metal layer L2 include a single metal strip 148 of the second metal with metal strips 146, 150 of the second metal on both sides of the central metal strip 148. As a result, there is a double layer of the second metal (e.g., copper) in the center of the clad metal composite 154. When the layers L1, L2, L3 are bonded, a core metal strip 8 is formed as an inlay with a stair step configuration. This embodiment is further shown in FIG. 13D with a central slit-cut to create two split strips of bonded clad metal composites 154A, 154B.

FIGS. 14A, 14B, 14C and 14D illustrate an embodiment that includes four metal layers L1, L2, L3, L4. In this embodiment, the first layer L1, second layer L2 and third layer L3 are the same as the clad metal composite 10 illustrated in FIGS. 5A and 5B. The layers L1, L2, L3 all have two aluminum metal strips and a central copper metal strip and the base layer has a single metal strip of aluminum as illustrated in FIG. 5A. The metal strips in the first, second and third metal layers L1, L2, L3 include a single central metal strip 14, 20, 26 of copper with metal strips of aluminum on both sides. However, the copper metal strip in the second layer is wider than the copper metal strip in the first and third metal layers. The three layers L1, L2, L3 are bonded so that there is a triple layer of copper in the center of the clad metal composite 10. Once bonded, the fourth layer L4 of a supplemental base metal strip 160 is added, wherein the supplemental base metal strip 160 is a single metal strip of aluminum. This fourth layer L4 is then bonded with the clad metal composite 10 to produce a bonded clad metal composite 162 having three layer core copper metal strip as an inlay with a stair step configuration. This embodiment is further shown in FIG. 14D with a central slit-cut to create two split strips of the clad metal composite 162A, 162B.

Having thus described exemplary embodiments of a method to produce metallic composite metal, it should be noted by those skilled in the art that the within disclosures are exemplary only and that various other alternatives, adaptations, and modifications may be made within the scope of this disclosure. Accordingly, the invention is not limited to the specific embodiments as illustrated herein, but is only limited by the following claims.

What is claimed is:

1. A method for creating a clad metal composite strip comprising the steps of:

a) providing a first layer of metal strips including a first side strip of a first metal, a second side strip of the first metal and a center strip of a second metal, the first side strip abutting one edge of the center strip and the second side strip abutting the opposite edge of the first center strip, wherein the first center strip has a first width and the first and second side strips having a second width;

b) aligning a second layer of metal strips with the first layer of metal strips, the second layer of metal strips having a width commensurate with the width of the first layer of metal strips and including a second center strip of the second metal and a third and fourth side strips of the first metal, the third side strip abutting one edge of the second center strip and the fourth side strip abutting the opposite edge of the second center strip, wherein the second center strip has a third width and the third and fourth side strips have a fourth width;

c) aligning a third layer of metal strips with the second layer of metal strips, the third layer of metal strips having a width commensurate with the width of the first and second layers of metal strips and including a third center strip of the second metal and a fifth and sixth side strips of the first metal, the fifth side strip abutting one edge of the third center strip and the sixth side strip abutting the opposite edge of the third center strip, wherein the width of the third center strip is commensurate with the first width and the width of the fifth and sixth side strips is commensurate with the second width, wherein the second width of the second center strip varies from the first width of the first and third center strips; and d) bonding the layers of metal strips together into a first clad metal composite.

2. The method as described in claim 1 further comprising the steps of:

aligning a fourth layer of a metal strip with the bonded metal strip, the fourth layer having a width commensurate with the width of the first clad metal composite and comprising the second metal; and bonding the fourth layer with the bonded metal strip.

3. The method as described in claim 1, wherein the first metal is aluminum and the second metal is copper.

4. The method as described in claim 1, wherein the first metal is selected from the group consisting of aluminum, steel, stainless steel, and nickel, and the second metal is selected from the group consisting of copper and aluminum, the first metal being unique to the second metal.

5. The method as described in claim 1, wherein the first metal is selected from the group consisting of steel and stainless steel, and the second metal is selected from the group consisting of aluminum and nickel.

6. The method as described in claim 1 wherein, prior to step d), further comprising the step of adding a metal strengthener layer between the first layer and the second layer and/or between the second and third layer.

7. The method as described in claim 6 wherein the metal strengthener layer is selected from the group consisting of nickel, aluminum, steel, stainless steel, and copper.

8. The method as described in claim 1 further comprising the step of sintering the layers of the bonded metal strips after bonding.

9. The method as described in claim 1 further comprising the step of:

repeating steps a) through d) to prepare a second clad metal composite; and bonding the first clad metal composite with the second clad metal composite to form a double core layer clad metal composite.

10. The method as described in claim 9 wherein, prior to bonding the first clad metal composite with the second clad metal composite, performing the steps of:
   positioning a metal strengthener between the first clad metal composite and the second clad metal composite; and
   bonding the first clad metal composite, the metal strengthener, and the second clad metal composite to form a strengthened double core layer bond clad metal composite.

11. The method as described in claim 9 further comprising the steps of:
   repeating steps a) through d) of claim 1 to prepare a third clad metal composite; and
   bonding the first bonded metal composite, the second clad metal composite, and the third clad metal composite to form a triple core layer bond clad metal composite.

12. The method as described in claim 11 wherein, prior to bonding the first clad metal composite, the second clad metal composite, and the third clad metal composite, performing the steps of:
   positioning a first metal strengthener between the first clad metal composite and the second clad metal composite;
   positioning a second metal strengthener between the second clad metal composite and the third clad metal composite; and
   bonding the first clad metal composite, the first metal strengthener, the second clad metal composite, the second metal strengthener, and the third clad metal composite to form a strengthened triple core layer bond clad metal composite.

13. A method of creating a clad metal composite with an inlay laminate construction comprising the steps of:
   a) providing a base layer having at least one metal strip of the first metal, the base layer having a composite width;
   b) providing a primary layer comprising two side strips of a first metal and a center metal strip of a second metal, the center strip positioned between the two side strips, the primary layer of metal strips having a width substantially equivalent to the composite width;
   c) aligning the primary layer of metal strips with the base layer of at least one metal strips; and
   d) bonding the primary and base layers of metal strips to form a clad metal composite with an inlay laminate construction.

14. The method as described in claim 13 wherein, prior to step d), including the steps of:
   providing a top layer comprising a metal strip of the first metal, the top layer of metal strip having a composite width; and
   bonding the top, primary and base layers to form a clad metal composite with a center core laminate construction.

15. The method as described in claim 13 wherein, prior to step d), including the steps of:
   providing a top layer comprising two top side strips of the first metal and a top center metal strip of the second metal, the top center strip positioned between the two top side strips, the top layer of metal strips having a composite width; and
   bonding the top, primary and base layers to form a clad metal composite with a inlay laminate construction.

16. The method as described in claim 15 wherein the width of the top center metal strip varies from the width of the center metal strip of the primary layer to form a clad metal composite with a stepped inlay laminate construction.

17. The method as described in claim 15 wherein step a) comprises:
   providing a base layer comprising two side strips of a first metal and a center metal strip of a second metal, the center strip positioned between the two side strips, the base layer of metal strips having the composite width.

18. The method as described in claim 17 further comprising the steps of:
   producing a first clad metal composite;
   repeating the steps to prepare a second clad metal composite; and
   bonding the first clad metal composite with the second clad metal composite.

19. The method as described in claim 17 wherein the width of the base center metal strip varies from the width of the center metal strip of the primary layer.

20. The method as described in claim 19 further comprising the steps of:
   aligning a fourth layer of a supplemental base metal strip with the base layer, the fourth layer having a width commensurate with the composite width and comprising the first metal; and
   bonding the fourth layer with the bonded metal strip.

21. The method as described in claim 18, wherein prior to bonding the first clad metal composite with the second clad metal composite, including the step of:
   adding a strengthener between the first clad metal composite with the second clad metal composite.

22. The method as described in claim 21 further comprising the steps of:
   repeating the steps of claim 17 to prepare a third clad metal composite; and
   bonding the first clad metal composite, the second clad metal composite, and the third metal composite.

23. The method as described in claim 22, wherein prior to bonding the first clad metal the second clad metal composite, and the third clad metal composite, including the steps of:
   adding a first metal strengthener between the first clad metal composite with the second clad metal composite; and
   adding a second metal strengthener between the second clad metal composite and the third clad metal composite.

24. The method as described in claim 13, wherein the first metal is selected from the group consisting of aluminum, steel, nickel and stainless steel, and the second metal is selected from the group consisting of copper and aluminum, the first metal being unique to the second metal.

25. The method as described in claim 13, wherein the first metal is selected from the group consisting of steel and stainless steel, and the second metal is selected from the group consisting of aluminum and nickel.

* * * * *